(12) United States Patent
Ekkizogloy et al.

(10) Patent No.: US 7,957,651 B2
(45) Date of Patent: *Jun. 7, 2011

(54) CONFIGURABLE OPTICAL TRANSCEIVER FEATURE SPECIFIC COST TRANSACTION

(75) Inventors: Luke M. Ekkizogloy, San Jose, CA (US); Jayne C. Hahin, Cupertino, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 935 days.

This patent is subject to a terminal disclaimer.

(21) Appl. No.: 11/256,329

(22) Filed: Oct. 21, 2005

(65) Prior Publication Data
US 2006/0093370 A1 May 4, 2006

Related U.S. Application Data

(60) Provisional application No. 60/623,267, filed on Oct. 29, 2004.

(51) Int. Cl.
*H04B 10/00* (2006.01)
*H04B 10/12* (2006.01)

(52) U.S. Cl. ........................... 398/140; 398/135
(58) Field of Classification Search .................. 398/135, 398/140
See application file for complete search history.

(56) References Cited

U.S. PATENT DOCUMENTS

| | | | |
|---|---|---|---|
| 3,909,791 A | 9/1975 | van den Berg | |
| 4,093,988 A | 6/1978 | Scott | |
| 4,330,870 A | 5/1982 | Arends | |
| 4,745,573 A | 5/1988 | Lebel | |
| 4,947,411 A | 8/1990 | Shiraishi et al. | |
| 5,003,591 A * | 3/1991 | Kauffman et al. | 380/232 |
| 5,550,666 A | 8/1996 | Zirngibl | |
| 5,778,218 A | 7/1998 | Gulick | |
| 5,812,857 A | 9/1998 | Nelson et al. | |
| 5,845,077 A * | 12/1998 | Fawcett | 709/221 |
| 5,956,168 A | 9/1999 | Levinson et al. | |
| 5,994,940 A | 11/1999 | Kawasaki | |

(Continued)

FOREIGN PATENT DOCUMENTS

JP 59110227 6/1984

OTHER PUBLICATIONS

U.S. Appl. No. 11/256,498, filed Oct. 21, 2005, Jayne C. Hahin.
U.S. Appl. No. 11/256,290, filed Oct. 21, 2005, Gerald L. Dybsetter.
U.S. Appl. No. 11/119,447, filed Apr. 29, 2005, Gerald L. Dybsetter et al.
U.S. Appl. No. 11/220,765, Oct. 26, 2009, Final Office Action.

(Continued)

*Primary Examiner* — Ken N Vanderpuye
*Assistant Examiner* — Daniel G Dobson
(74) *Attorney, Agent, or Firm* — Maschoff Gilmore & Israelsen

(57) ABSTRACT

An environment that facilitates the purchasing and updating of specific operational features in an optical transceiver (or optical transmitter or optical receiver). The environment includes a host computing system (hereinafter referred to as the "host"), a network, a remote computing site, and an optical transceiver having a system memory and at least one processor. The host determines what specific operational feature is desired. A request to purchase the specific operational feature is sent over the network from the host to the remote computing site. The remote computing site responds to this request by providing the host information by which microcode corresponding to the purchased specific feature may be accessed. The host may then access the feature specific microcode. Finally, the host provides the feature specific microcode to the optical transceiver memory where it may later be executed by the processor.

14 Claims, 3 Drawing Sheets

U.S. PATENT DOCUMENTS

| | | | |
|---|---|---|---|
| 6,081,888 | A | 6/2000 | Bell et al. |
| 6,449,075 | B1 | 9/2002 | Watson et al. |
| 6,735,731 | B2 | 5/2004 | Ewen et al. |
| 6,862,322 | B1 | 3/2005 | Ewen et al. |
| 7,080,245 | B2* | 7/2006 | Ballard et al. ............ 713/2 |
| 7,146,412 | B2* | 12/2006 | Turnbull ............ 709/220 |
| 7,215,891 | B1 | 5/2007 | Chiang et al. |
| 7,249,353 | B2 | 7/2007 | Zarco |
| 7,269,191 | B2* | 9/2007 | Stewart et al. ............ 372/34 |
| 7,313,681 | B2 | 12/2007 | Chen et al. |
| 2002/0027688 | A1 | 3/2002 | Stephenson |
| 2002/0112070 | A1 | 8/2002 | Ellerbrock et al. |
| 2002/0176131 | A1 | 11/2002 | Walters et al. |
| 2002/0176138 | A1 | 11/2002 | Schlanger |
| 2003/0002108 | A1 | 1/2003 | Ames et al. |
| 2003/0152390 | A1 | 8/2003 | Stewart et al. |
| 2003/0154282 | A1 | 8/2003 | Horvitz |
| 2004/0017794 | A1 | 1/2004 | Trachewsky |
| 2004/0022537 | A1 | 2/2004 | Mecherle et al. ............ 398/41 |
| 2004/0052528 | A1 | 3/2004 | Halgren et al. |
| 2004/0103347 | A1 | 5/2004 | Sneed et al. |
| 2004/0136422 | A1* | 7/2004 | Mahowald et al. ........ 372/38.02 |
| 2004/0136720 | A1* | 7/2004 | Mahowald et al. ........ 398/135 |
| 2004/0151073 | A1 | 8/2004 | Preisach |
| 2004/0202476 | A1 | 10/2004 | Woolf et al. |
| 2004/0260798 | A1* | 12/2004 | Addington et al. ............ 709/223 |
| 2005/0044335 | A1 | 2/2005 | Bee et al. |
| 2005/0132349 | A1 | 6/2005 | Roberts et al. |
| 2006/0051049 | A1 | 3/2006 | Hahin |
| 2006/0051098 | A1 | 3/2006 | Hahin |

OTHER PUBLICATIONS

U.S. Appl. No. 11/119,447, Jun. 8, 2009, Notice of Allowance.
U.S. Appl. No. 11/119,447, Jun. 23, 2006, Office Action
U.S. Appl. No. 11/119,447, Nov. 29, 2006, Office Action.
U.S. Appl. No. 11/119,447, Jul. 6, 2007, Office Action.
U.S. Appl. No. 11/119,447, Apr. 8, 2008, Office Action.
U.S. Appl. No. 11/119,447, Dec. 5, 2008, Office Action.
U.S. Appl. No. 11/220,769, Mar. 19, 2008, Office Action.
U.S. Appl. No. 11/220,769, Jul. 16, 2008, Office Action.
U.S. Appl. No. 11/220,769, Jan. 22, 2009, Office Action.
U.S. Appl. No. 11/220,769, Sep. 25, 2009, Office Action.
U.S. Appl. No. 11/220,769, Mar. 25, 2010, Office Action.
U.S. Appl. No. 11/220,769, Apr. 29, 2010, Notice of Allowance.
U.S. Appl. No. 11/220,765, Mar. 19, 2008, Office Action.
U.S. Appl. No. 11/220,765, Jul. 16, 2008, Office Action.
U.S. Appl. No. 11/220,765, Jan. 28, 2009, Office Action.
U.S. Appl. No. 11/256,290, Feb. 19, 2008, Office Action.
U.S. Appl. No. 11/256,290, Sep. 3, 2008, Office Action.
U.S. Appl. No. 11/256,290, Apr. 6, 2009, Office Aciton.
U.S. Appl. No. 11/256,290, Dec. 29, 2009, Office Action.
U.S. Appl. No. 11/256,290, Mar. 19, 2010, Notice of Allowance.
U.S. Appl. No. 11/256,498, Apr. 2, 2008, Office Action.
U.S. Appl. No. 11/256,498, Dec. 17, 2008, Office Action.
U.S. Appl. No. 11/256,498, Aug. 13, 2009, Office Action.
U.S. Appl. No. 11/256,498, Mar. 26, 2010, Office Action.
U.S. Appl. No. 11/220,765, May 12, 2010, Office Action.
U.S. Appl. No. 11/256,290, May 14, 2010, Notice of Allowance.
U.S. Appl. No. 11/220,769, May 21, 2010, Notice of Allowance.

* cited by examiner

CONFIGURABLE OPTICAL TRANSCEIVER FEATURE SPECIFIC COST TRANSACTION

CROSS-REFERENCE TO RELATED APPLICATIONS

This application claims the benefit of U.S. Provisional Application No. 60/623,267, filed Oct. 29, 2004, which is incorporated herein by reference in its entirety.

BACKGROUND OF THE INVENTION

1. The Field of the Invention

The present invention relates generally to optical transmitters, receivers, and transceivers. More specifically, the present invention relates to methods and mechanisms for the purchasing and updating of custom features for optical transmitters, receivers and transceivers.

2. Background and Relevant Art

Computing and networking technology have transformed our world. As the amount of information communicated over networks has increased, high speed transmission has become ever more critical. Many high speed data transmission networks rely on optical transceivers, transmitters, receivers, and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. Nevertheless, the features that may be desired by customers for these optical transceivers may be different, customer by customer. Accordingly, what would be advantageous is for customers to have the ability to purchase and add specific features to the optical transmitters, receivers, and transceivers that give more flexibility to the operation of these devices.

BRIEF SUMMARY OF THE INVENTION

The foregoing problems with the prior state of the art are overcome by the principles of the present invention, which relate to an environment that enables the purchasing and updating of specific features that govern the behavior of an optical transceiver (or optical transmitter or optical receiver). The environment includes an optical transceiver host computing system (hereinafter simply referred to as "host") communicatively couplable to an optical transceiver including a memory and one or more processors.

The host identifies desired transceiver specific features to purchase and transmits a request to purchase the features to a remote computing site. The request to purchase may be in the form of a credit card payment request or other method of payment. In response to the request to purchase, the host receives information by which microcode corresponding to the purchased specific feature may be accessed. The host accesses the microcode and provides it to the memory of the optical transceiver. It may later be executed by the one or more processors to implement the desired feature. Accordingly, the present invention provides a quick and easy way to purchase and update new specific operational features whenever desired to update the operational features of the transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an environment that facilitates the purchasing and updating of specific operational features in an optical transceiver (or optical transmitter or optical receiver). The environment includes a host computing system (hereinafter referred to as the "host"), a network, a remote computing site, and an optical transceiver having a memory and at least one processor. The host determines what specific operational feature is desired. A request to purchase the specific operational feature is sent over the network from the host to the remote computing site. The remote computing site responds to this request by providing the host information that may be used to facilitate access to microcode corresponding to the purchased feature. The host may then access the feature specific microcode. Finally, the host provides the feature specific microcode to the optical transceiver memory where it may later be executed by the processor. An example of the environment will first be described. Then, the operation in accordance with the invention will be described with respect to the example environment.

Figure 1:
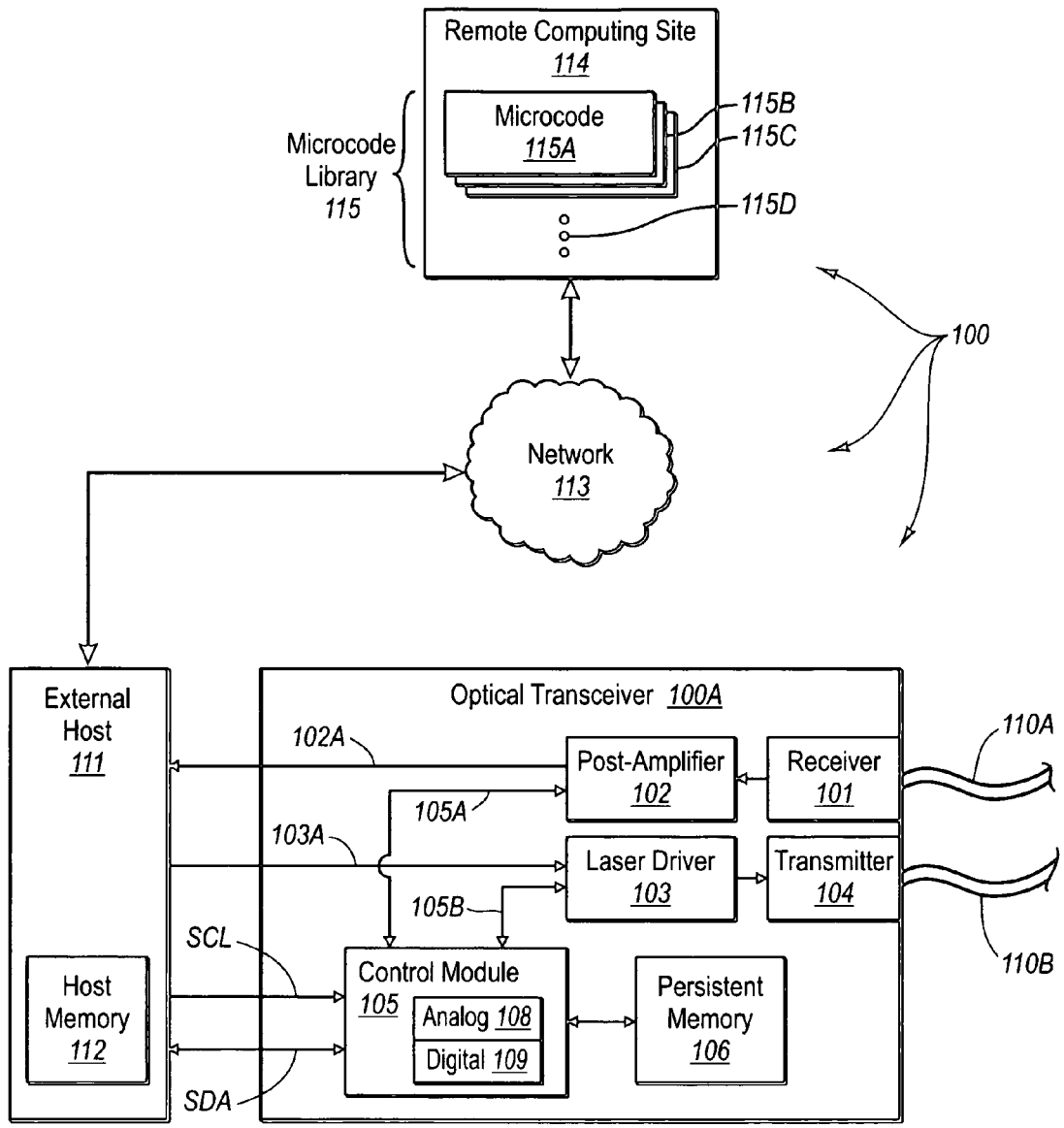
FIG. 1 schematically illustrates an example of an environment including an optical transceiver that may implement features of the present invention.

FIG. 1 illustrates an environment 100 in which the principles of the present invention may be employed. The environment 100 includes an optical transceiver 100A, which will now be described. While the optical transceiver 100A will be described in some detail, the optical transceiver 100A is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100A receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100A. The external host 111 may contain a host memory 112 that may be a volatile or non-volatile memory source. In one embodiment, the optical transceiver 100A may be a printed circuit board or other components/chips within the host 111, although this is not required.

The optical transceiver 100A may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100A includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/ or the laser driver 103 as also represented by the arrows 105A and 105B. These settings adjustments are quite intermittent since they are only made when temperature or voltage or other low frequency changes so warrant.

Figure 2:
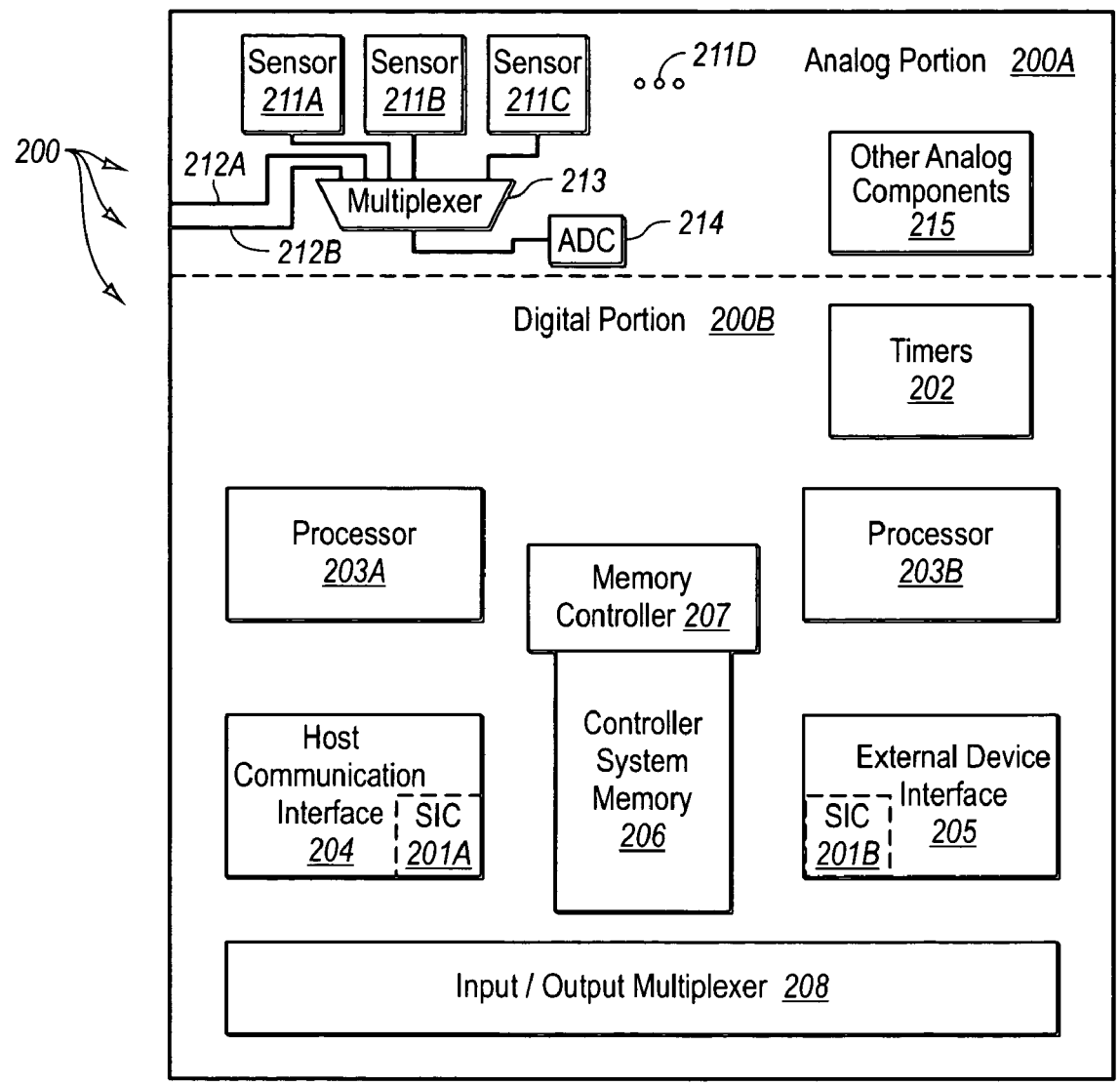
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100A using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to ananalog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100A. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Referring again to FIG. 1, the control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Host 111 may be any computing system communicatively couplable to transceiver 100A. In this description and in the claims, two entities are "communicatively couplable" if they are capable of being communicatively coupled with each other. In this description and in the claims, "communicatively coupled" is defined as being capable of communicating data either one way or bi-directionally. A keyboard or a mouse (not shown) may be connected to host 111 through use of a serial or parallel port to facilitate user control of host 111 operational functions. Host 111 may also be equipped with a computer monitor or other display device.

Host 111 may also contain a host memory 112. Host memory 112 may be a persistent memory such as a Read Only Memory (ROM). Alternatively or in addition, host memory 112 may be a volatile memory source such as a Random Access Memory (RAM). Additionally, the host memory 112 may also be a processor, register, flip-flop or other memory device. Host memory 112 may be used to store microcode received from a wide area network or other similar source.

Host 111 may be connected to a network 113. Network 113 may be a wide area network such as the Internet that allows data transfer between two or more computing systems connected through public networks. The network 113 may support any standard network or internet protocol such as, for example, Internet Protocol (IP), File Transfer Protocol (FTP) or Ethernet protocol.

Network 113 may connect host 111 to a remote computing site 114. Remote computing site 114 may be any computing system capable of transmitting microcode to another computing system over network 113. Remote computing site 114 may contain a library of microcode 115. For example, the microcode library 115 is illustrated as including microcode segments 115A, 115B, 115C amongst potentially many other as represented by the ellipses 115D. Each of the microcode segments 115A through 115D may be structured to implement various specific operational features in transceiver 100A when executed. The remote computing site 114 may transmit one or more of the microcode segments 115 to host 111 through network 113.

Remote computing site 114 may be further configured to support a user interface such as a World Wide Web site (herein after also referred to as "web site"). For example, the web site may contain a page that has radio buttons that correspond to microcode 115. A user may identify which one or more of the microcode segments 115A, 115B, 115C, 115D, etc. to purchase by selecting, for example, the radio button for that feature using the keyboard or mouse connected to host 111.

In addition, the web site may be designed to receive requests to purchase one or more of the microcode segments of microcode library 115. For example, the web site may contain a place (e.g., a web page field) to enter electronic payment information such as a credit card number. On receipt of the payment request, remote computing site 114 may be configured to send the purchased microcode to the requesting computing system.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present environment relate to a method for electronically purchasing specific transceiver specific operational features and downloading feature specific microcode that implements the operational features. An example embodiment of the present invention will be described with reference to FIGS. 1 and 2.

In many cases, transceiver 100A may implement specific operational features determined by the transceiver manufacturer. However, a user may desire to add additional operational features to meet specific needs or circumstances for a given transceiver 100A. The principles of the present invention allow for a user to identify additional operational features and for microcode implementing these additional operational features to be purchased and received by persistent memory 106 and controller system memory 206 and later to be executed by processors 203. The principles of the present invention also operate to allow a user to identify operational features that may be performed by the transceiver even when initializing the transceiver 100A with microcode. In the description and in the claims, "microcode" is defined to mean any type of operational or control code, such as, but not limited to, firmware and software, that runs on a microprocessor and controls the operation of the transceiver when executed.

Suppose that a user desires to update or add a specific operational feature for transceiver 100A by purchasing new feature specific microcode. There may be many different types of specific operational features available for purchase. In this description and in the claims, a "specific operational feature" is defined as a specific transceiver operational function that is implemented by executing feature specific microcode. The following are examples of operational features. These examples are not exhaustive and should not be read to limit the claims.

One example is an alarm or warning setting. This allows a user to specify that an alarm be triggered when an operational parameter such as temperature reaches a certain value. Another example is custom diagnostics in addition to any standard diagnostics. For example, a user may be more interested in the operation of the laser driver 103. A diagnostic could run specific checks on the laser driver 103 and report the results back to the host 111. A third example of an operational feature would allow the user to set various operational parameters such as voltage minimum and maximum, operating time, up time, and temperature at desired levels. A fourth example would allow for off transceiver module logging of transceiver operational data.

Figure 3:
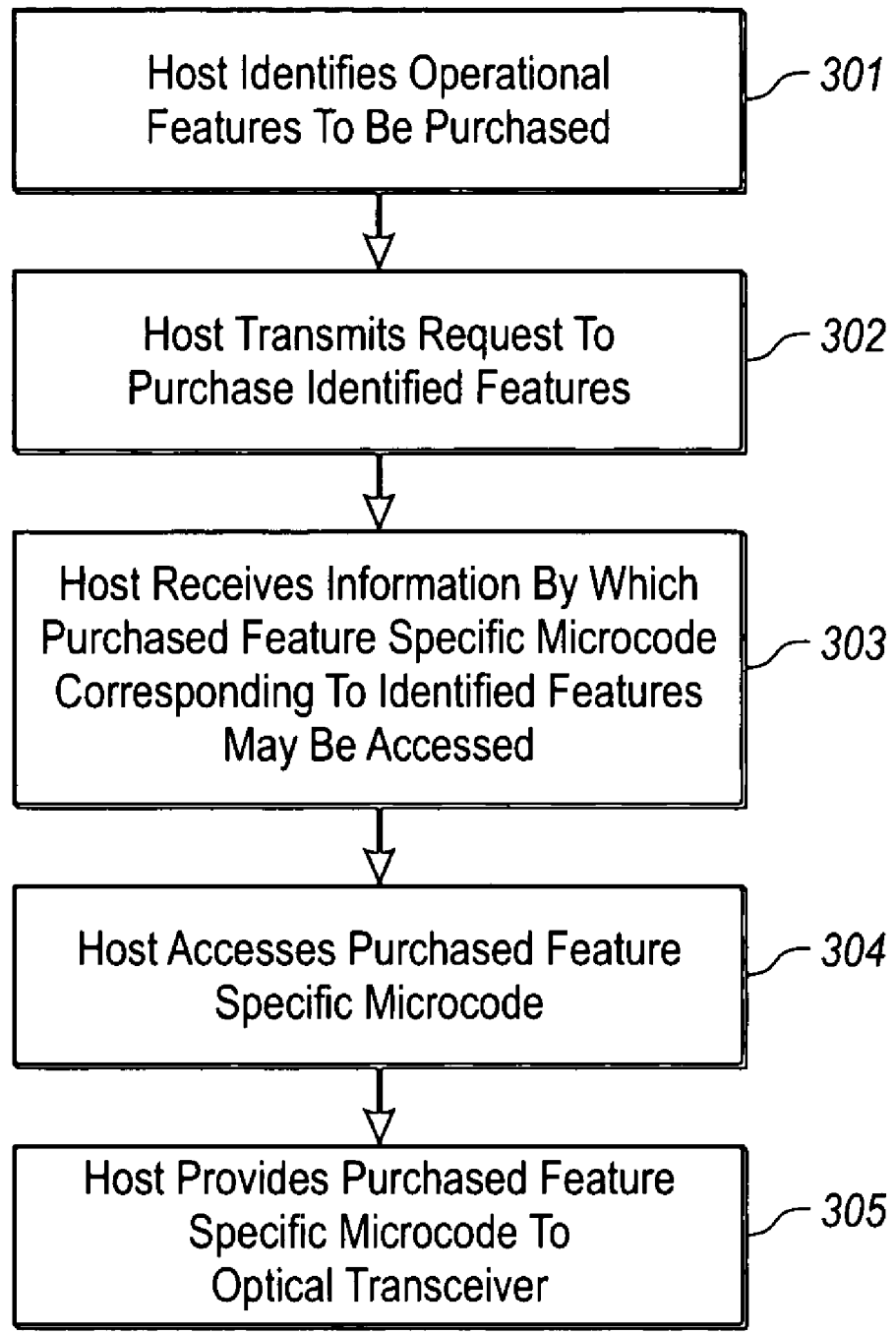
FIG. 3 illustrates a flowchart of a method for an optical transceiver host computing system to facilitate purchasing and updating of optical transceiver features in accordance with the principles of the present invention.

Referring to FIG. 3, a flowchart of a method 300 for an optical transceiver host computing system ("host") to facilitate purchasing and updating of optical transceiver specific features is illustrated. First, the host identifies desired transceiver operational features to be purchased (act 301). For example, in the environment described with respect to FIGS. 1 and 2, host 111 accesses remote computing site 114 over network 113. Host 111 may display a remote computing site 114 interface such as a web page on an attached monitor. If the web page were configured with radio buttons as discussed above, then a user may determine the desired specific operational feature to purchase by selecting the appropriate radio button with the host 111 keyboard or mouse.

In additional embodiments, the host computing system may be a computing system that a human user contacts using a telephone or other like device. The user then specifies which of the specific operational features he or she desires to purchase and this is then communicated to remote computing site 114.

For example, if the user desired to purchase a temperature warning alarm, then the user would select the radio button corresponding to that specific feature. Additionally, if the user desired to purchase multiple specific features, then the user would select more than one radio button. For example, if the user desired to purchase the temperature warning alarm feature and the off transceiver module logging feature, then the user would select the radio buttons corresponding to both of those features. The user may in like manner use the host to identify any number of additional specific features to purchase.

The remote computing site 114 may be further configured to contain a library of feature specific microcode 115. Microcode library 115 may be comprised of individual segments of feature specific microcode 115A, 115B, 115C, 115D, etc. that correspond to, and when executed implement, each of the identified specific operational features. The remote computing site 114 may access the feature specific microcode segments 115A, 115B, 115C, 115D, etc. corresponding to the specific operational feature identified by the selected radio button for purchase.

The host then transmits a request to purchase the desired specific operational features (act 302). In the example environment, host 111 transmits over network 113 to remote computing site 114 a request to purchase the selected specific operational features. This may be accomplished in a number of ways. For example, the user may input a credit card number with the host 111 keyboard. This credit card number may be associated to an account with a credit card issuer. The credit card number may then be transmitted by host 111 to remote computing site 114. Alternatively, the user may access host 111 to input a bank account number with directions to debit the bank account. The number and the directions to debit may also be transmitted by host 111 over network 113 to remote computing site 114. Additionally, the user may access host 111 to direct that an amount of money be electronically wired to an appropriate place. This direction may also be sent by host 111 over network 113 to remote computing site 114. There may also be other methods, either now known or identified in the future, that will enable use of the present invention to make a request to purchase the specific operational feature. Thus, the optical transceiver host transmits a request to purchase the desired specific operational feature.

Referring again to the method of FIG. 3, the host receives, in response to the request to purchase, information by which purchased feature specific microcode corresponding to the identified features may be accessed (act 303). This may be in the form of permission to access the feature specific microcode or directions on how to download the microcode. The information may also be a decryption key to enable decryption of encrypted feature specific microcode. For example, in the example environment, remote computing site 114 may respond to the request for payment from host 111 by sending directions on how to download the feature specific microcode to host 111.

The host may then access the purchased feature specific microcode (act 304). In the example environment, host 111 may download the selected feature specific microcode segments 115 over network 113 to host memory 112. For example, if the user had selected the temperature warning alarm feature and had made a request to purchase this feature by providing a credit card number in the manner already described, and had sent this information over network 113 to remote computing site 114, then host memory 112 would receive the temperature warning alarm feature specific microcode from remote computing site 114.

Remote computing site 114 may also respond in this manner to requests to purchase multiple specific operational features. For example, if the user selected the temperature warning alarm feature and the off transceiver module logging feature and a request to purchase both features in a manner discussed previously was sent over network 113, then host memory 112 would receive the selected feature specific microcode segments from remote computing site 114 corresponding to both features.

Finally, the host provides the purchased feature specific microcode to the optical transceiver (act 305). For example, the purchased feature specific microcode received by host memory 112 may be provided to transceiver 100A for execution and implementation. Host 111 may be configured to provide the feature specific microcode to control module 105 over the SDA and SCL lines or other implemented host communication interface. For example, a user may interface with host 111 using the attached keyboard and direct host 111 to provide the purchased feature specific microcode to control module 105. If multiple segments of feature specific microcode have been purchased, the user may elect to provide all of the microcode to transceiver 100A at one time.

Alternatively, the user may elect to send different segments of feature specific microcode at different times to transceiver 100A. Additionally, host 111 may be configured to automatically provide the purchased feature specific microcode to transceiver 100A anytime the purchased feature specific microcode is received by host memory 112. The host 111 may even be configured to automatically update the optical transceiver 100A in response to having downloaded the feature specific microcode 115.

The feature specific microcode may be stored in persistent memory 106 for later execution. Alternatively, the microcode may be directly loaded into controller system memory 206 for more immediate execution. The processors 203 execute the microcode, causing the transceiver 100A to implement and perform the identified operational features. For example, if the temperature warning alarm feature specific microcode was loaded into controller system memory 206 and executed by processors 203, then transceiver 100A would implement a temperature warning alarm.

In another embodiment, host 111 may receive the feature specific microcode from a source other than remote computing site 114. For example, the feature specific microcode may be delivered to the user on a portable storage unit such as a digital video disk (DVD) or a compact disk (CD) ROM from the transceiver 100A manufacturer. The feature specific microcode stored on the DVD or CD may be loaded into host memory 112 and later to transceiver 100A. Alternatively, transceiver 100A may have the feature specific microcode library 115 pre-loaded into persistent memory 106.

The feature specific microcode, either from the temporary storage unit or pre-loaded, may be encrypted to prevent unauthorized access. In order for a user to execute the feature specific microcode, a decryption key may be needed. The decryption key may be separate microcode that is structured to allow a user to access and execute the feature specific microcode from the temporary storage unit or that is pre-loaded into persistent memory 106.

A user may access remote computing site 114 and use host 111 to identify desired operational features (act 301). However, instead of containing a library of feature specific microcode 115, the remote computing site may contain a library of decryption keys. The user would select the radio buttons corresponding to the specific operational features and corresponding feature specific microcode decryption key segments 115A, 115B, 115C, etc that the user desired to implement in transceiver 100A.

The user would then use host 111 to transmit to remote computing site 114 a request to purchase the selected decryption keys corresponding to the desired features (act 302). This may be done in the manner already described. For example, the user may provide a credit card number or a bank account number.

Remote computing site 114 may then respond to the request for purchase by providing the host 111 with access to the selected decryption keys (act 303). The decryption keys may then be sent over network 113 and received by host memory 112 in the manner described in the previous embodiment. Once received, host 111 may use the purchased decryption keys to obtain access to the encrypted feature specific microcode (act 304).

For example, if the encrypted feature specific microcode had been loaded into host memory 112 by a DVD, then host 111 may use the purchased decryption keys to decrypt the feature specific microcode stored in host memory 112. This decrypted feature specific microcode may then be provided to control module 105 over the SDA and SCL lines for later execution by processors 203 (act 305).

Alternatively, if the encrypted feature specific microcode had been pre-loaded into persistent memory 106, then host 111 would provide the purchased decryption keys to control module 105. Control module 105 would load the encrypted feature specific microcode from persistent memory 106 and would use the purchased decryption keys to decrypt the feature specific microcode (act 305). Processors 203 would execute the feature specific microcode and transceiver 100A would then implement the specific operational feature as directed by the feature specific microcode.

For example, suppose a user desired to implement the temperature warning alarm feature. Further suppose that persistent memory 106 was pre-loaded with specific microcode library 115. The user would access remote computing site 114 and would use host 111 and network 113 to select the radio box corresponding to the temperature warning alarm feature as already described. A request for purchase would also be sent by host 111 to remote computing site 114 as described. Remote computing site 114 would respond by sending the decryption key that corresponded to the selected feature to host 111. Host 111 would provide this decryption key to control module 105. Control module 105 would use the decryption key to decrypt the temperature alarm specific microcode stored in persistent memory 106. This would allow processors 203 to execute the microcode. However, the decryption key would not allow the user to execute any other segment of specific microcode library 115 stored in the persistent memory. The user would be required to purchase additional keys.

The principles of the present invention provide a mechanism for the purchase of transceiver specific operational features. This is accomplished by the downloading of transceiver feature specific microcode. A user may select the desired operational feature by accessing a remote computing site over a network with the transceiver host computer. The user may send a request to purchase the operational feature to the remote computing site. In response to the request, the feature specific microcode may be provided to the host and later to the transceiver. This mechanism thus provides a quick and easy way to purchase new specific operational features whenever a user desires to update the operational features of a transceiver. Accordingly, the principles of the present invention represent a significant advancement in the art of purchasing and updating optical transceiver specific operational features.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an environment that includes an optical transceiver host computing system communicatively couplable to an optical transceiver that has a memory and one or more processors, a method for the optical transceiver host to facilitate purchasing and updating of feature specific microcode that governs behavior of an optical transceiver, the method comprising:

an act of the optical transceiver host computing system receiving user input to identify desired transceiver specific operational features to be purchased, wherein each feature is implemented by the one or more processors executing feature specific microcode;

an act of the optical transceiver host computing system transmitting a request to purchase the desired transceiver specific operational features;

an act of receiving a response to the request to purchase in the form of information by which purchased feature specific microcode corresponding to the desired transceiver specific operational features may be accessed, wherein the response to the request to purchase comprises receiving a purchased decryption key;

an act of accessing the purchased feature specific microcode;

an act of providing the purchased feature specific microcode to the optical transceiver memory, wherein the desired transceiver specific operational features to be purchased are one or more of an alarm or warning setting, a diagnostics feature, a feature that allows a user to set a plurality of operational parameters, and an off module logging feature;

wherein the act of accessing the purchased feature specific microcode comprises decryting encrypted feature specific microcode using the purchased decryption key; and wherein the encrypted feature specific microcode is loaded in a memory local to the optical transceiver host prior to receipt of the user input identifying desired transceiver specific operational features to be purchased.

2. A method in accordance with claim 1, wherein transmitting the request to purchase desired transceiver specific operational features comprises transmitting a credit card number over a network to a remote computing site with directions to charge a credit account associated with the credit card number.

3. A method in accordance with claim 1, wherein transmitting the request to purchase desired transceiver specific operational features comprises transmitting over a network to a remote computing site a bank account number with directions to debit the bank account associated with the bank account number.

4. A method in accordance with claim 1, wherein transmitting the request to purchase desired transceiver specific operational features comprises transmitting over a network to a remote computing site directions to electronically wire money to specific location.

5. A method in accordance with claim 1, wherein the response to the request to purchase comprises receiving permission to access the purchased feature specific microcode.

6. A method in accordance with claim 1, further comprising:
an act of executing at least a portion of the purchased feature specific microcode using the one or more processors.

7. In an environment that includes an optical transmitter host computing system communicatively couplable to an optical transmitter that has a memory and one or more processors, a method for the optical transmitter host to facilitate purchasing and updating of feature specific microcode that governs behavior of an optical transmitter, the method comprising:
an act of the optical transmitter host computing system receiving user input to identify desired transmitter specific operational features to be purchased, wherein each feature is implemented by the one or more processors executing feature specific microcode;
an act of the optical transmitter host computing system transmitting a request to purchase the desired transmitter specific operational features;
an act of receiving a response to the request to purchase in the form of information by which purchased feature specific microcode corresponding to the desired transmitter specific operational features may be accessed, wherein the response to the request to purchase comprises receiving a purchased decryption key;
an act of accessing the purchased feature specific microcode;
an act of providing the purchased feature specific microcode to the optical transmitter memory;
wherein the act of accessing the purchased feature specific microcode comprises decrytin feature specific microcode using the purchased decryption key; and wherein the encrypted feature specific microcode is loaded in a memory local to the optical transmitter host prior to receipt of the user input identifying desired transmitter specific operational features to be purchased.

8. A method in accordance with claim 7, wherein the optical transmitter is part of an optical transceiver.

9. A method in accordance with claim 7, wherein transmitting the request to purchase desired transmitter specific operational features comprises transmitting over a network to a remote computing site one of a credit card number with directions to charge a credit account associated with the credit card number, a bank account number with directions to debit the bank account, or directions to electronically wire money to specific location.

10. A method in accordance with claim 7, further comprising:
an act of executing at least a portion of the purchased feature specific microcode using the one or more processors.

11. In an environment that includes an optical receiver host computing system communicatively couplable to an optical receiver that has a memory and one or more processors, a method for the optical receiver host to facilitate purchasing and updating of feature specific microcode that governs behavior of an optical receiver, the method comprising:
an act of the optical receiver host computing system receiving user input to identify desired receiver specific operational features to be purchased, wherein each feature is implemented by the one or more processors executing feature specific microcode;
an act of the optical receiver host computing system transmitting a request to purchase the desired receiver specific operational features;
an act of receiving a response to the request to purchase in the form of information by which purchased feature specific microcode corresponding to the desired receiver specific operational features may be accessed, wherein the response to the request to purchase comprises receiving a purchased decryption key;
an act of accessing the purchased feature specific microcode;
an act of providing the purchased feature specific microcode to the optical transmitter memory;
wherein the act of accessing the purchased feature specific microcode comprises decrytin encrypted feature specific microcode using the purchased decryption key; and
wherein the encrypted feature specific microcode is loaded in a memory local to the optical receiver host prior to receipt of the user input identifying desired receiver specific operational features to be purchased.

12. A method in accordance with claim 11, wherein the optical receiver is part of an optical transceiver.

13. A method in accordance with claim 11, wherein transmitting the request to purchase desired receiver specific operational features comprises transmitting over a network to a remote computing site one of a credit card number with directions to charge a credit account associated with the credit card number, a bank account number with directions to debit the bank account, or directions to electronically wire money to specific location.

14. A method in accordance with claim 11, further comprising:
an act of executing at least a portion of the purchased feature specific microcode using the one or more processors.

* * * * *